United States Patent
Lobo et al.

(10) Patent No.: US 7,653,136 B2
(45) Date of Patent: Jan. 26, 2010

(54) DECODING METHOD AND DECODING APPARATUS

(75) Inventors: Austin Lobo, Suwon-si (KR); Sang-rae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 974 days.

(21) Appl. No.: 11/023,547

(22) Filed: Dec. 29, 2004

(65) Prior Publication Data

US 2005/0152459 A1   Jul. 14, 2005

(30) Foreign Application Priority Data

Jan. 14, 2004   (KR) .................. 10-2004-0002713

(51) Int. Cl.
*H04N 7/12* (2006.01)
(52) U.S. Cl. ............. 375/240.27; 375/240; 375/240.01; 375/240.25
(58) Field of Classification Search .................. 375/240, 375/240.01, 240.12, 240.25, 240.27
See application file for complete search history.

(56) References Cited

U.S. PATENT DOCUMENTS

| | | | |
|---|---|---|---|
| 7,257,162 B2 * | 8/2007 | Viscito et al. .......... | 375/240.25 |
| 2002/0034253 A1 | 3/2002 | Nagai et al. | |
| 2002/0122493 A1 | 9/2002 | Lin | |
| 2003/0012286 A1 | 1/2003 | Ishtiaq et al. | |

FOREIGN PATENT DOCUMENTS

| | | |
|---|---|---|
| CN | 1216653 A | 5/1999 |
| EP | 1126725 A1 | 8/2001 |
| JP | 2002-335526 | 11/2002 |
| KR | 2001-80299 | 8/2001 |
| KR | 2002-71754 A | 9/2002 |
| KR | 2003-65694 A | 8/2003 |
| KR | 2003-66225 A | 8/2003 |
| WO | WO 03/041382 A2 | 5/2003 |

OTHER PUBLICATIONS

Chinese Office Action dated Oct. 27, 2006 issued in CN 200510002074X.

* cited by examiner

*Primary Examiner*—Allen Wong
(74) *Attorney, Agent, or Firm*—Stanzione & Kim LLP

(57) ABSTRACT

A decoding method of detecting a transmission error region and recovering correctly decoded data and a decoding apparatus using the same. The decoding method includes comparing encoding status information with decoding status information by receiving encoded data and the encoding status information of at least one synchronization point set in every predetermined period to detect a transmission error and to obtain the decoding status information of a corresponding synchronization point while decoding the encoded data, and continuing to decode the received data if the encoding status information of the at least one synchronization point is the same as the decoding status information of the corresponding synchronization point, and recovering previously decoded data before a previous synchronization point by detecting a transmission error region between the corresponding synchronization point and the previous synchronization point if the encoding status information is different from the decoding status information. It is possible to detect an error for each synchronization point and recover data positioned in a region having no error.

38 Claims, 3 Drawing Sheets

| S0 | codIRange0 | codIOffset0 |
| S1 | codIRange1 | codIOffset1 |
| S2 | codIRange2 | codIOffset2 |
| S3 | codIRange3 | codIOffset3 |

FIG. 4

DECODING METHOD AND DECODING APPARATUS

CROSS-REFERENCE TO RELATED APPLICATIONS

This application claims the benefit of Korean Patent Application No. 2004-2713, filed on Jan. 14, 2004, in the Korean Intellectual Property Office, the disclosure of which is incorporated herein in its entirety by reference.

BACKGROUND OF THE INVENTION

1. Field of the Invention

The present general inventive concept relates to an image decoding method, and more particularly, to a decoding method of detecting a transmission error region and recovering data having no transmission error and a decoding apparatus using the same.

2. Description of the Related Art

Since a large amount of data is necessary to process images, data compression is indispensable for effectively processing images. For data compression, there are various standards, such as joint photographic experts group (JPEG), moving picture experts group (MPEG)-1, MPEG-2, MPEG-4, H.261, H.263, H.264, etc. In addition, on-going standardization work for data compression includes additional functions, such as virtual reality and authentication.

According to conventional data compression standards, an encoder encodes digital image data by segmenting the digital image data into blocks of a certain length. The encoded data is transmitted to a decoder, and then decoded according to the same standard that is used to encode the data blocks. Huffman's coding and arithmetic coding are widely used as encoding/decoding methods.

The arithmetic coding method uses a probability reference line and an offset extending between 0 and 1, and is a method of encoding symbols into floating point numbers so that each symbol falls within a certain range in part of the offset according to their probabilities. Once the offset and the range are defined, all symbols are encoded into particular floating point numbers. The encoded floating point numbers are transmitted to the decoder and then decoded according to the same principle.

Figure 1:
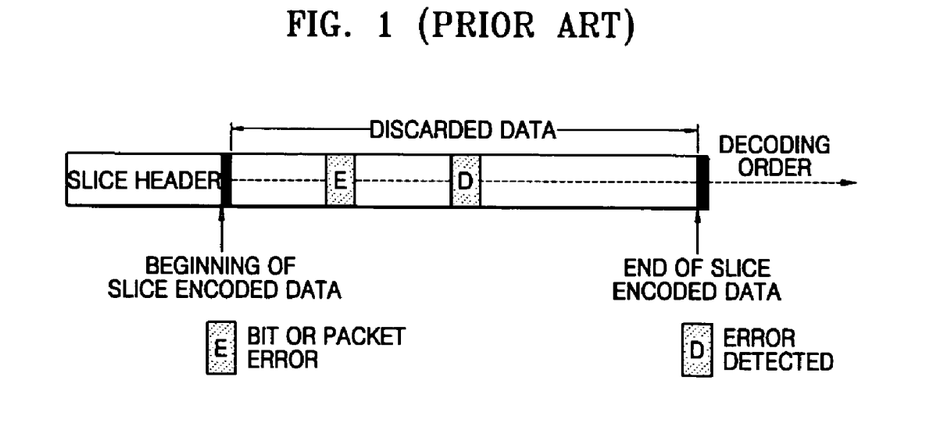
FIG. 1 illustrates a slice diagram to describe an error processing method when a transmission error occurs according to a conventional decoding method.

Problems may arise as a result of errors that occur during transmission. FIG. 1 illustrates a slice diagram for describing a method of processing a transmission error according to a conventional decoding method.

FIG. 1 illustrates an example of a slice encoded by using a context adaptive binary arithmetic coding (CABAC) according to the H.264 standard. The slice includes a header and a plurality of macro blocks. A conventional decoder detects an exceptional state D or an undefined state caused by a transmission error E in bits or packets during a decoding process of the encoded slice, and then processes the transmission error E. In other words, in some instances in which the exceptional state D is detected during the decoding process, the decoder determines that the transmission error E has occurred such that the entire slice is discarded. In this case, the discarded slice includes the macro blocks (from a start point of the slice to a position of the transmission error E) which have been accurately decoded without any transmission error, and the macro blocks (behind a position of the exceptional state D) which are to be decoded after the errored macro block, as well as the macro blocks having the transmission error E.

A conventional decoder does not provide a method of detecting an accurate position of the transmission error E and thus can not distinguish between a correctly decoded macro block and an errored macro block. Thus, the entire slice including the correctly decoded regions (from the start point of the slice to the position of the transmission error E) must be discarded, because it may be impossible to recover the correctly decoded regions. If the exceptional state D occurs due to the transmission error E in one bit located near the end of the slice, all the previously decoded correct macro blocks are discarded due to a one bit error.

Furthermore, since a transmission error is not detected in an actual transmission error region E but in a region that follows the exceptional state D after the subsequent decoding is progressed, it may be impossible to detect the actual transmission error region. Accordingly, the decoding is unnecessarily progressed after the transmission error occurs, thereby causing a waste of time and resources.

SUMMARY OF THE INVENTION

The present general inventive concept provides a decoding method of detecting a transmission error region and recovering correctly decoded data and a decoding apparatus using the same.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a decoding method to decode encoded data divided into a plurality of predetermined periods, the method comprising comparing encoding status information with decoding status information by receiving encoded data and the encoding status information of at least one synchronization point set in every predetermined period to detect a transmission error and to obtain the decoding status information of a corresponding at least one synchronization point while decoding the encoded data, and continuing to decode the encoded data if the encoding status information of the at least one synchronization point is the same as the decoding status information of the corresponding at least one synchronization point, and recovering previously decoded data before a previous synchronization point by detecting a transmission error region between the corresponding at least one synchronization point and the previous synchronization point if the encoding status information of the at least one synchronization point is different from the decoding status information of the corresponding at least one synchronization point.

The at least one synchronization point may be used as a reference point to detect a transmission error, and may be set in a periodic position in a unit of at least one macro block of the encoded data.

The encoding status information may be received separately from the encoded data by way of additional information such as a supplementary enhancement information raw byte sequence payload (SEI-RBSP).

The received data may be encoded according to a context adaptive binary arithmetic coding (CABAC), and the encoding status information and the decoding status information may include a range and an offset based on probability of the data to be encoded.

The foregoing and/or other aspects and advantages of the present general inventive concept may also be achieved by providing a decoding apparatus to decode encoded data divided into a plurality of predetermined periods, the apparatus comprising a decoding unit to receive and decode encoded data, and an error detection/processing unit comparing decoding status information of at least one synchronization point set in every predetermined period with encoding status information of a corresponding at least one synchronization point which is received separately from the encoded data in order to detect a transmission error in the decoded data and controlling the decoding unit to continue to decode the encoded data if the decoding status information of the at least one synchronization point is the same as the encoding status information of the corresponding at least one synchronization point, and to recover previously decoded data before a previous synchronization point by detecting a transmission error region between the at least one synchronization point and the previous synchronization point if the decoding status information of the at least one synchronization point is different from the encoding status information of the corresponding at least one synchronization point.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
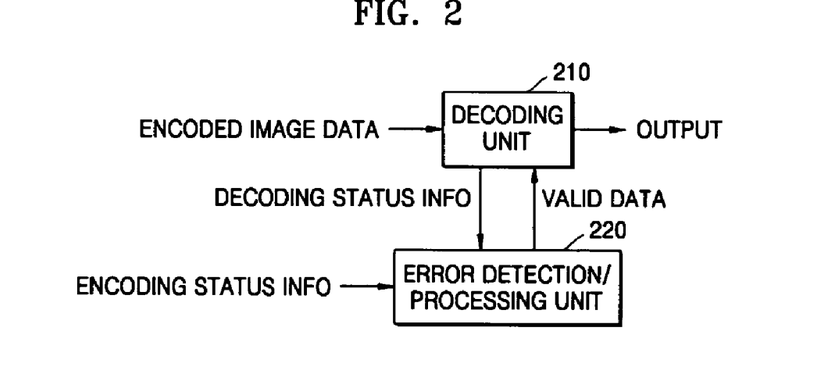
FIG. 2 illustrates a block diagram of a decoding apparatus to detect a transmission error region and to recover correctly decoded data according to an embodiment of the present general inventive concept.

FIG. 2 illustrates a block diagram of a decoding apparatus to detect a transmission error region and to recover correctly decoded data according to an embodiment of the present general inventive concept.

A decoding apparatus according to the present general inventive concept comprises a decoding unit 210 and an error detection/processing unit 220.

The decoding unit 210 receives encoded data from an encoder and decodes the encoded data. The encoded data may be digital image data. Other types of encoded data may also be decoded according to the method and apparatus of the present general inventive concept.

The error detection/processing unit 220 detects a transmission error in the decoded data of the decoding unit 210 by comparing decoding status information of a synchronization point with corresponding encoding status information separately received from the encoder, and then processes it. More specifically, in order to detect the transmission error in the decoded data, the error detection/processing unit 220 compares the decoding status information of a plurality of synchronization points set in every period with corresponding encoding status information received separately from the encoded data. If the decoding status information of a certain synchronization point is the same as the encoding status information of a corresponding synchronization point, the error detection/processing unit 220 allows the decoding process to be continued until a next synchronization point is reached. If the decoding status information of the certain synchronization point is different from the encoding status information of the corresponding synchronization point, the error detection/processing unit 220 detects a transmission error region between the certain synchronization point and a previous synchronization point and recovers the previously decoded data before the previous synchronization point. The certain synchronization point may be a current synchronization point reached in the decoded data.

Figure 3:
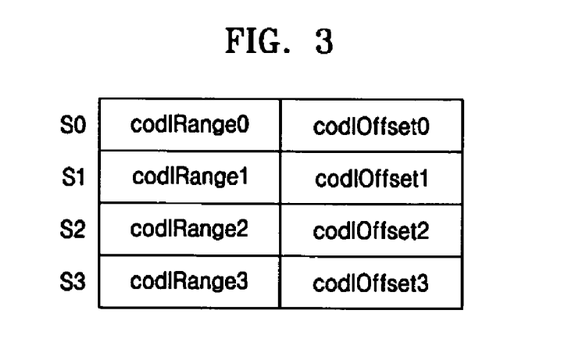
FIG. 3 illustrates an example of encoding status information separately received to detect a transmission error region in the decoding apparatus of FIG. 2.

FIG. 3 shows an example of encoding status information separately received to detect a transmission error region in the decoding apparatus of FIG. 2.

The encoding status information includes a range CodlRange and an offset CodlOffset obtained to encode the data of each synchronization point S0, S1, S2, and S3 into floating point numbers according to an arithmetic coding method. According to the arithmetic coding method, if the offset, which represents a probability reference line, and a range of the probability of each symbol are determined, an encoding result of the corresponding symbol can be output as a floating point number. The encoder separately encodes the offset and the range for the data of the corresponding synchronization point as the encoding status information when the data is encoded and then transmitted to the decoder. For example, according to the H.264 standard, the encoding status information can be transmitted to the decoder by way of a supplementary enhancement information raw byte sequence payload (SEI-RBSP). The decoder receives the encoding status information from the encoder separately from the encoded data. The decoder obtains the decoding status information including the range and the offset for the data corresponding to each synchronization point in every predetermined period while decoding the received encoded data, and then compares the decoding status information with the encoding status information.

The encoding status information includes ranges and offsets calculated by the encoder with respect to the data in each synchronization point before the transmission, and the decoding status information includes ranges and offsets calculated by the decoder with respect to the data in the same position after the transmission. Therefore, if the encoding status information is the same as the decoding status information, the data has been accurately transmitted without any transmission errors.

On the other hand, if the encoding status information is different from the decoding status information, a transmission error has occurred. According to an embodiment of the present general inventive concept, the aforementioned comparison is performed with respect to each period, and a region determined to have a transmission error is limited to a period between the previous synchronization point $S(i-1)$ and the certain synchronization point Si. The data in the period is discarded if the result of the comparison shows that the encoding status information is different from the decoding status information. However, since the data before the previous synchronization point is determined to have been correctly decoded, the data before the period is considered valid data and is then recovered. Any undecoded data after the period may also be discarded. Alternatively, once the data in the period is discarded, the decoding process may resume at a next period.

The synchronization points are used as reference points to detect a transmission error, and may be set in a periodic position in a unit of at least one macro block of the encoded data. From the encoder, the synchronization point specifies a data position where the encoding status information of the slice data encoded according to, for example, a context adaptive binary arithmetic coding (CABAC) method and is transmitted to the decoder by way of, for example, the SEI-RBSP. A plurality of synchronization points can be set in order to determine which position of the slice has a transmission error. For example, the synchronization points can be set in every macro block in the slice except the first one in the slice. In this case, locations for decoding a flag, mb_skip_flag, in each macro block can be set as the synchronization points in P, B, or SP slices. In another example, positions for decoding a flag, mb_field_decoding flag, or a flag, mb_type, can be set as the synchronization points in I or SI slices. Otherwise, several macro blocks are combined to be used as a unit of the synchronization point. Alternatively, positions of the synchronization points may not have a fixed period. The positions of the synchronization points can be appropriately modified to obtain a meaningful error detection period as well as to cause no overhead in the encoding status information. For example, a smaller period may allow a minimum amount of decoded data to be wasted in the event of a transmission error, because a size of the period being discarded is small. On the other hand, a larger period may keep a processing cost down, because a number of periods being processed and checked for transmission errors is reduced.

Figure 4:
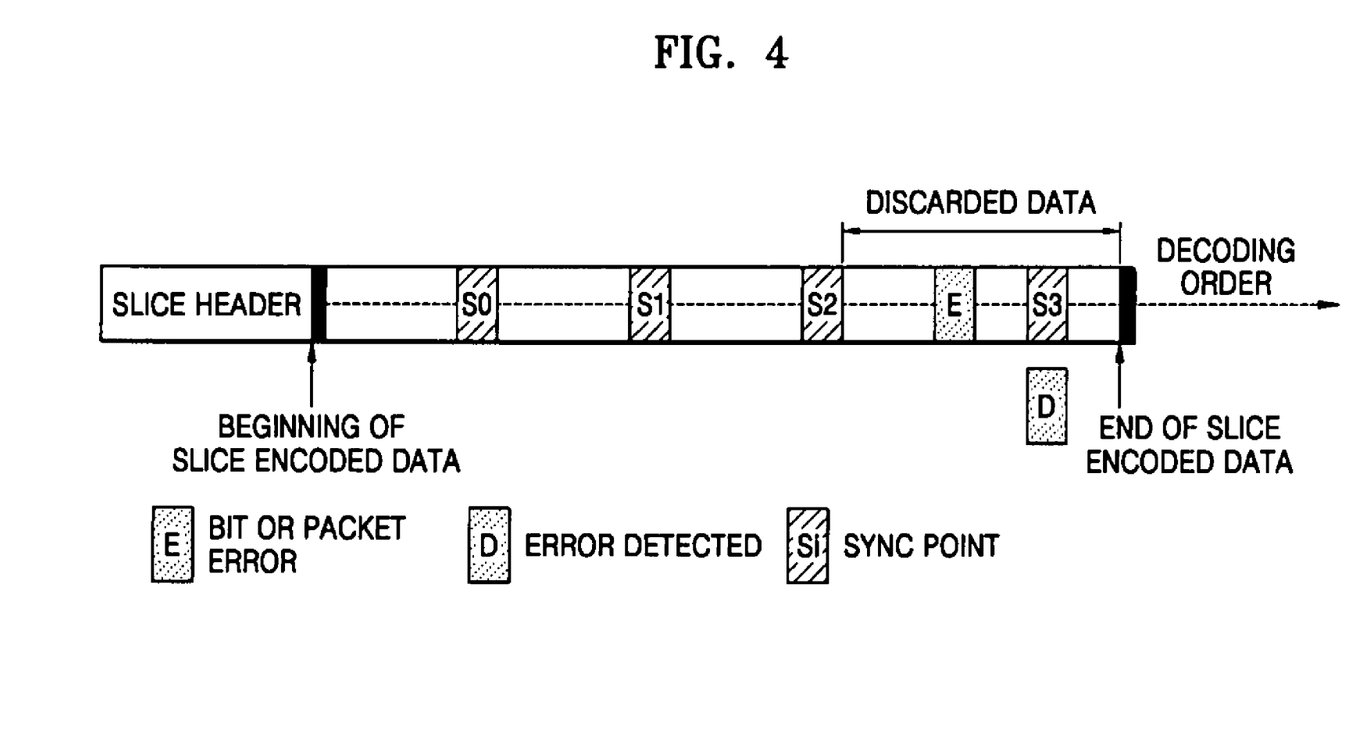
FIG. 4 illustrates a slice format to describe an error processing method when a transmission error occurs in the decoding apparatus of FIG. 2.

FIG. 4 illustrates an example of a slice format to describe an error processing method when a transmission error region is detected during the decoding process in the decoding apparatus of FIG. 2.

The slice comprises a header and a plurality of macro blocks. From a start point of the slice to an end point, the synchronization points S0, S1, S2, and S3 are set in periodic positions. While decoding the data along a dashed arrow line illustrated in FIG. 4, a decoder obtains decoding status information of a certain synchronization point (i.e., a current synchronization point) when each designated synchronization point S0, S1, S2, and S3 is reached. Then, the decoding status information is compared with encoding status information corresponding to the same synchronization point. As shown in FIG. 2, the encoding status information is received separately from the encoded data. The result of the comparison determines whether an error occurred in transmission/decoding the data in a period just before the certain synchronization point.

For example, when the synchronization point S1 is reached, a corresponding range and an offset are obtained as the decoding status information of the synchronization point S1, and then compared with a range codlRange1 and an offset codlOffset, which is the encoding status information of the synchronization point S1. If both the encoding status information and the decoding status information are the same, it is determined that the decoding is properly performed without errors, and then the decoding is progressed.

As illustrated in FIG. 4, the error processing method according to the present general inventive concept recognizes that an error E occurs between the synchronization point S2 and the synchronization point S3, because the decoding status information for the synchronization point S3 (i.e., current synchronization point) is different from the encoding status information for the synchronization point S3. Therefore, the data between the previous synchronization point S2 to the end of the slice is discarded. The discarded data includes the data in the transmission error region between the synchronization points S2 and S3 and remaining data that has not been decoded. However, since the previously decoded data in the region from the start point of the slice to the synchronization point S2 is determined to be correctly decoded without a transmission error, it can be considered valid data. Therefore, the valid data can be recovered and displayed. This provides an advantage over the conventional decoder, because the decoded data need not go to waste.

By way of example, an entropy encoding is performed according to a binary arithmetic coding (CABAC) of the H.264 standard, the encoding status information (codlRange, codlOffset) of a certain synchronization point according to the present general inventive concept is encoded separately from actual image data encoded by a fixed length of nine bits and then is transmitted to the decoder using the SEI-RBSP.

The decoder separately receives the actual image data and the encoding status information, and obtains decoding status information (Range, Offset) for the data of the certain synchronization point when each synchronization point (S0, S1, and S3) is reached while decoding the actual image data. The decoding status information is then compared with the encoding status information (codlRange, codlOffset). If the information is the same, there is no transmission error before the certain synchronization point. If the information is different, a transmission error has occurred between a previous synchronization point and the certain synchronization point. Therefore, the data positioned from the previous synchronization point S2 to the end of the slice, including a bit or packet having the transmission error therein, are discarded, and the data positioned from the start point of the slice to the previous synchronization point S2 is recovered because it is determined to have no error.

Figure 5:
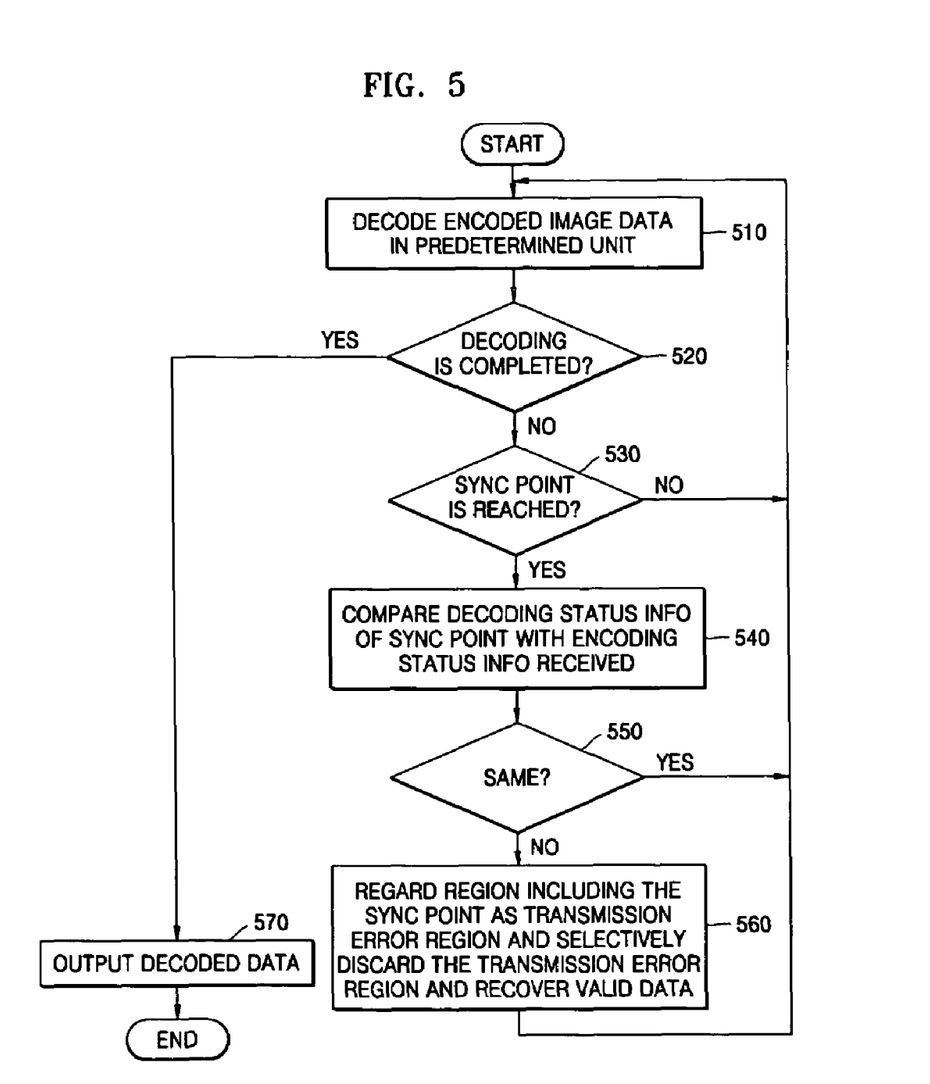
FIG. 5 illustrates a flow chart of a decoding method to detect a transmission error region and to recover correctly decoded data according an embodiment of the present general inventive concept.

FIG. 5 illustrates a flow chart of a decoding method of detecting a transmission error region and recovering correctly decoded data according to an embodiment of the present general inventive concept.

The decoding method according to the present general inventive concept to decode encoded data divided into a plurality of predetermined periods comprises comparing encoding status information with decoding status information by receiving encoded data and the encoding status information of at least one synchronization point set in every predetermined period and obtaining the decoding status information corresponding to the at least one synchronization point while decoding the encoded data, and continuing to decode the received data if the encoding status information of the at least one synchronization point is the same as the decoding status information of the corresponding synchronization point, and recovering previously decoded data before a previous synchronization point by detecting a transmission error region between the corresponding synchronization point and the previous synchronization point if the encoding status information of the at least one synchronization point is different from the decoding status information of the corresponding synchronization point.

More specifically, referring to FIG. 5, until the decoding process is complete (operation 520), the received encoded data is decoded using a predetermined unit such as a macro block (operation 510). During the decoding process of the encoded data, when a current synchronization point is reached (operation 530) the decoding status information of the current synchronization point is compared with the encoding status information of a corresponding synchronization point, which has been separately received from the encoded data (operation 540). As a result of the comparison (operation 550), if the decoding status information of the current synchronization point is the same as the encoding status information of the corresponding synchronization point, the decoding process is continued (operation 510). If the decoding status information is different from the encoding status information, it is determined that an error has occurred. A transmission error region from a previous synchronization point to the end of the slice is selectively discarded, and valid data positioned from the start point of the slice to the previous synchronization point is recovered (operation 560). If the decoding process is completed (operation 520), the decoded data is output to a display device (operation 570).

The general inventive concept can also be embodied as a computer readable code on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices The computer readable recording medium can also be distributed over network coupled computer systems so that the computer readable code is stored and executed in a distributed fashion.

According to the present general inventive concept, it is possible to provide a decoding method and a decoding apparatus to detect a transmission error region and to recover correctly decoded data.

Accordingly, an error is detected not in the limited case of an exceptional state like the conventional art but whenever each synchronization point is reached, so that data positioned in a region having no error can be selectively recovered. In addition, it is possible to solve a conventional problem that the decoding time is unnecessarily consumed after an actual transmission error occurs.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A decoding method to decode encoded data, the method comprising:
comparing, by an error detection/processing unit, encoding status information with decoding status information by receiving encoded data and the encoding status information of at least one synchronization point set in every predetermined period to detect a transmission error and to obtain the decoding status information of a corresponding at least one synchronization point while decoding the encoded data; and
continuing, by a decoding unit, to decode the received data if the encoding status information of the at least one synchronization point is the same as the decoding status information of the corresponding at least one synchronization point, and recovering, by the error detection/processing unit, previously decoded data before a previous synchronization point by detecting a transmission error region between the corresponding at least one synchronization point and the previous synchronization point if the encoding status information is different from the decoding status information.

2. The decoding method of claim 1, wherein the at least one synchronization point is used as a reference point to detect a transmission error, and is set in a periodic position in a unit of at least one macro block of the encoded data.

3. The decoding method of claim 1, wherein the encoding status information is received separately from the encoded data using additional information including a supplementary enhancement information raw byte sequence payload (SEI-RBSP).

4. The decoding method of claim 1, wherein the received data is encoded according to a context adaptive binary arithmetic coding, and the encoding status information and the decoding status information include a range and an offset based on probability of data to be encoded.

5. The decoding method of claim 1, wherein the encoded data comprises a data slice having a plurality of macro blocks, each macro block having a synchronization point except for a first macro block.

6. The decoding method of claim 5, wherein the synchronization point of each macro block corresponds to a location of a decoding flag.

7. A method of decoding encoded data, the method comprising:
receiving, by a decoding unit, encoded data divided into a plurality of blocks of a predetermined length, each of the plurality of blocks being defined by one or more synchronization points;
receiving, by an error detection/processing unit in communication with the decoding unit, encoding status information for each of the plurality of blocks of the encoded data;
decoding, by the decoding unit, at least one block of received encoded data and determining decoding status information for the at least one block of decoded data;
if the decoding status information for the at least one block of decoded data matches the encoding status information for a corresponding at least one block of encoded data, decoding, by the decoding unit, a next block of received encoded data; and
if the decoding status information for the at least one block of decoded data does not match the encoding status information for the corresponding at least one block of encoded data, determining, by the error detection/processing unit, that a transmission error has occurred between the one or more synchronization points defining the at least one block of decoded data.

8. The method according to claim 7, further comprising:
if the transmission error is determined to have occurred in the at least one block of decoded data, discarding the at least one block of decoded data and data in any undecoded blocks of the encoded data, and recovering data in any previous blocks of decoded data.

9. The method according to claim 7, wherein the at least one block of decoded data is defined by a corresponding synchronization point and a previous synchronization point.

10. The method according to claim 7, wherein the predetermined length of the plurality of blocks is periodic.

11. The method according to claim 7, wherein the encoded data comprises digital image data.

12. The method according to claim 7, wherein the encoded data is encoded according to an arithmetic coding method.

13. The method according to claim 12, wherein the decoding status information and the encoding status information include an offset and a range.

14. A method of decoding encoded data, the method comprising:

receiving, by a decoding unit, the encoded data and corresponding encoding status information, the encoded data being divided into a plurality of blocks of a predetermined length defined by synchronization points;

determining, by the error detection/processing unit, decoding status information for a current synchronization point of decoded data; and comparing, by the error detection/processing unit, the decoding status information for the current synchronization point and encoding status information for a corresponding synchronization point of the encoded data to determine if a transmission error has occurred between a previous synchronization point of the decoded data and the current synchronization point of the decoded data.

15. The method according to claim 14, wherein if the decoding status information for the current synchronization point and encoding status information for the corresponding synchronization point of the encoded data are the same, determining that no transmission error has occurred between the previous synchronization point of the decoded data and the current synchronization point of the decoded data.

16. The method according to claim 15, wherein if no transmission error has occurred between the previous synchronization point and the current synchronization point, determining the decoding status information for a next synchronization point of the decoded data and comparing the decoding status information for the next synchronization point and the encoding status information for a corresponding synchronization point of the encoded data to determine if a transmission error has occurred between the current synchronization point of the decoded data and the next synchronization point of the decoded data.

17. The method according to claim 14, wherein the encoded data and the corresponding encoding status information are received separately.

18. The method according to claim 14, further comprising:
before determining decoding status information for the current synchronization point of the decoded data, decoding the encoded data up to the current synchronization point.

19. The method according to claim 14, wherein the predetermined length is periodic.

20. The method according to claim 14, wherein if a transmission error has occurred between the previous synchronization point of the decoded data and the current synchronization point of the decoded data, the decoded data before the previous synchronization point is recovered and remaining data is discarded.

21. The method according to claim 14, wherein if it is determined that a transmission error has occurred between the previous synchronization point of the decoded data and the current synchronization point of the decoded data, the decoded data before the previous synchronization point is recovered and decoded data between the previous synchronization point and the current synchronization point is discarded.

22. The method according to claim 21, wherein the encoded data after the current synchronization point is subsequently decoded.

23. A decoding apparatus to decode the encoded data comprising:
a decoding unit to receive and to decode encoded data; and
an error detection/processing unit to compare decoding status information of at least one synchronization point set in every predetermined period with encoding status information of a corresponding at least one synchronization point which is received separately from the encoded data in order to detect a transmission error in the decoded data and to control the decoding unit to continue to decode the encoded data if the decoding status information of the at least one synchronization point is the same as the encoding status information of the corresponding at least one synchronization point, and to recover previously decoded data before a previous synchronization point by detecting a transmission error region between the corresponding at least one synchronization point and the previous synchronization point if the decoding status information is different from the encoding status information.

24. The decoding apparatus of claim 23, wherein the at least one synchronization point is used as a reference point to detect a transmission error, and is set in a periodic position in a unit of at least one macro block of the encoded data.

25. The decoding apparatus of claim 23, wherein the encoding status information is received separately from the encoded data by way of additional information including a supplementary enhancement information raw byte sequence payload (SEI-RBSP).

26. The decoding apparatus of claim 23, wherein the data is encoded according to a context adaptive binary arithmetic coding and the encoding status information and the decoding status information include a range and an offset based on probability of data to be encoded.

27. The decoding apparatus of claim 23, wherein the encoded data comprises a data slice having a plurality of macro blocks, each macro block having a synchronization point except for a first macro block.

28. The decoding apparatus of claim 27, wherein the synchronization point of each macro block corresponds to a location of a decoding flag.

29. A decoding apparatus comprising:
a decoding unit to receive encoded data divided into a plurality of blocks of predetermined length, each of the plurality of blocks being defined by one or more synchronization points and to decode at least one block of received encoded data; and
an error detection unit in communication with the decoding unit and to receive encoding status information for each of the plurality of blocks of the encoded data, to determine decoding status information for the at least one block of decoded data, and to compare the decoding status information for the at least one block of decoded data with encoding status information of a corresponding at least one block of encoded data to determine if a transmission error is present in the at least one block of decoded data.

30. The apparatus according to claim 29, wherein the encoding status information includes information that corresponds to the plurality of blocks calculated before transmission of the encoded data.

31. The apparatus according to claim 29, wherein if the error detection unit determines that the decoding status information for the at least one block of decoded data matches the encoding status information for the corresponding at least one block of decoded data, then the decoding unit decodes a next block of received encoded data.

32. The apparatus according to claim 29, wherein if the error detection unit determines that the decoding status information for the at least one block of decoded data does not match the encoding status information for the corresponding at least one block of encoded data, then the decoding unit discards decoded data in the at least one block of encoded data and recovers the data decoded before the at least one block of decoded data.

33. The apparatus according to claim 29, wherein if the error detection unit determines that the decoding status information for the at least one block of decoded data does not match the encoding status information for the corresponding at least one block of encoded data, then the error detection unit detects a transmission error in the at least one block of decoded data.

34. The apparatus according to claim 29, wherein the at least one block of decoded data is defined by a current synchronization point and a previous synchronization point.

35. The apparatus according to claim 29, wherein the predetermined length of the plurality of blocks is periodic.

36. The apparatus according to claim 29, wherein the encoded data comprises digital image data.

37. The apparatus according to claim 29, wherein the encoded data is encoded according to an arithmetic coding method.

38. The apparatus according to claim 37, wherein the decoding status information and the encoding status information include an offset and a range.

* * * * *

UNITED STATES PATENT AND TRADEMARK OFFICE
CERTIFICATE OF CORRECTION

PATENT NO. : 7,653,136 B2
APPLICATION NO. : 11/023547
DATED : January 26, 2010
INVENTOR(S) : Lobo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1428 days.

Signed and Sealed this

Twenty-eighth Day of December, 2010

David J. Kappos
*Director of the United States Patent and Trademark Office*